US007268183B2

(12) United States Patent
Wintermantel et al.

(10) Patent No.: US 7,268,183 B2
(45) Date of Patent: Sep. 11, 2007

(54) REACTIVE POLYURETHANE HOTMELTS WITH LARGE PSA RANGE

(75) Inventors: Matthias Wintermantel, Köln (DE); Hermann Perrey, Krefeld (DE); Christian Wamprecht, Neuss (DE); Walter Meckel, Düsseldorf (DE); Jürgen Ramthun, Bergisch Gladbach (DE)

(73) Assignee: Bayer MaterialScience AG, Leverkusen (DE)

( * ) Notice: Subject to any disclaimer, the term of this patent is extended or adjusted under 35 U.S.C. 154(b) by 239 days.

(21) Appl. No.: 10/641,550

(22) Filed: Aug. 15, 2003

(65) Prior Publication Data

US 2004/0068049 A1 Apr. 8, 2004

(30) Foreign Application Priority Data

Aug. 20, 2002 (DE) ................................ 102 38 005

(51) Int. Cl.
*C08G 18/00* (2006.01)
*C08J 3/00* (2006.01)
*C08K 3/20* (2006.01)
*C08L 75/00* (2006.01)
*C09J 201/00* (2006.01)

(52) U.S. Cl. ........................ 524/590; 524/589; 528/44; 156/60; 156/307.1; 156/307.3; 156/320; 156/327; 156/330.9; 156/331.1; 156/331.7

(58) Field of Classification Search ................ 524/589, 524/590; 528/44, 59, 66, 80, 81, 83, 84, 528/85; 525/123; 156/60, 307.1, 307.3, 156/320, 327, 330.9, 331.1, 331.4, 331.7
See application file for complete search history.

(56) References Cited

U.S. PATENT DOCUMENTS

| | | | | |
|---|---|---|---|---|
| 4,839,438 | A * | 6/1989 | Evers et al. | 525/440 |
| 4,999,407 | A | 3/1991 | Gilch et al. | 525/457 |
| 5,019,638 | A | 5/1991 | Müller et al. | 528/83 |
| 5,166,302 | A | 11/1992 | Werner et al. | 528/67 |
| 6,093,270 | A * | 7/2000 | Ferencz et al. | 156/73.5 |
| 6,191,212 | B1 | 2/2001 | Kube | 524/590 |
| 2003/0022973 | A1* | 1/2003 | Hung et al. | 524/270 |

OTHER PUBLICATIONS

Adhesives Age, Nov. 1987, pp. 32-35, "Shaping Reactive Hot Melts Using LMW Copolyesters" by H. F. Huber and H. Muller.

* cited by examiner

*Primary Examiner*—Patrick Niland
(74) *Attorney, Agent, or Firm*—Robert S. Klemz

(57) ABSTRACT

Reactive polyurethane hotmelts comprising crystallizing polyesterpolyols based on fumaric acid and 1,6-hexanediol. These hotmelts exhibit good pressure-sensitive adhesive (PSA) properties over a very broad temperature range. The reactive polyurethane hotmelts are prepared by mixing a polyol mixture containing at least on crystallizing polyesterpolyol with an excess of polyisocyanates.

19 Claims, 3 Drawing Sheets

REACTIVE POLYURETHANE HOTMELTS WITH LARGE PSA RANGE

CROSS REFERENCE TO RELATED PATENT APPLICATION

The present application claims the right of priority under 35 U.S.C. § 119 (a)-(d) of German Patent Application No. 10238005.8 filed Aug. 20, 2002.

FIELD OF THE INVENTION

The present invention relates to reactive polyurethane hotmelts comprising crystallizing polyesterpolyols based on fumaric acid and 1,6-hexanediol. These hotmelts exhibit good pressure-sensitive adhesive (PSA) properties over a very broad temperature range.

BACKGROUND OF THE INVENTION

Reactive polyurethane hotmelts are a fast-growing product group within polyurethane applications in the adhesives field. They are synthesized using preferably linear polyester- and/or polyetherpolyols in combination with an excess of polyisocyanates, preferably diisocyanates.

The advantages of this class of product lies above all in the absence of solvent, the possibility of applying the products hot at relatively low viscosities, of nevertheless obtaining high strengths and, after a relatively short time, owing to further reaction with moisture, of obtaining adhesive bonds having very high thermal stability, well beyond the application temperatures, and excellent solvent resistances.

Essential to the good profile of properties of the reactive polyurethane hotmelts is their ability to develop strengths very rapidly on cooling, which allows the joined parts to be handled immediately after joining.

Responsible for the development of the initial strengths are, as in the case of all hotmelts, only physical phenomena, since in a period of seconds to minutes it is not yet possible for any major chemical events to unfold. These physical events are in particular the strong, continuous rise in viscosity as a result of temperature reduction, further superimposed in some cases by a recrystallization effect, which constitutes a jump in the increase in strength.

One effective way of describing the events accompanying the cooling of polymer melts is to record the changes in the viscoelastic properties of the melts against the temperature. A particular possibility arising here is that of studying the events over the temperature range which coincides with the ranges that are of interest at that time.

In vibration experiments, i.e. where the deformation changes sinusoidally, the relaxation behaviour of a viscoelastic substance is manifested in a phase shift $\delta$ between the applied deformation and the resulting strain (or torque). According to definition, the following is the case: for purely elastic fluids the phase angle $\delta=0°$ and for purely viscous liquids an angle of $\delta=90°$ is measured. Characterizing variables are the storage modulus and loss modulus G'/G" (Pa), the complex viscosity $\eta^*$ (Pas) and the phase angle $\delta$ (°).

Use is made in particular of the variable of the storage modulus G' in the development of adhesives, under the concept of what is termed the Dahlquist criterion or of the PSA band (pressure sensitive adhesives). In the literature, the storage modulus range G' from $5\times10^4$ to $5\times10^5$ Pa is assigned to the Dahlquist criterion. The Dahlquist criterion, in other words the presence of a storage modulus in the range from $5\times10^4$to $5\times10^5$ Pa, denotes the ability of polymers to bond with themselves, with other polymers and with other substrates.

The model developed by Dahlquist (C. A. Dahlquist, Proc. Nottingham Conf. On Adhesion, Maclaren & Sons Ltd., London 1996, Part III, Chapter 5; or else in A. J. Frank, Adhesives Rheology, brochure Rheometrics Present at Afera Congress in Chester, Sep. 24, 1992) starts initially from the purely mechanical conception that, before the various physical adhesion mechanisms (dipole interactions, hydrogen bonds, van der Waal forces, diffusion of chains) can become effective, the materials must be brought into intimate contact to allow these forces (with a range of just a few angstroms) to be active at all. It is illuminating that this contact problem becomes greater as a result of high storage moduli. In the case of adhesives, the lower limit is set via an inadequate cohesive strength.

When some typical reactive polyurethane hotmelt systems are viewed from this standpoint, the cases described below are observed.

When crystalline polyols are used, the storage modulus G' extends to just above the recrystallization temperature in the region of <1000 Pa; in other words, the melt at this point has no cohesive strength at all, and adherends must be held mechanically. The Dahlquist criterion is then traversed within a temperature range of a few ° C., in order to build up storage moduli of $>10^6$ Pa immediately, which correspond to forces so high that they no longer allow any repositioning of the substrates to be bonded at all.

Hotmelt systems based on crystalline polyesterpolyols, as described for example in EP-A 0 354 527, exhibit very low viscosities above the recrystallization temperature, which although they allow effective wetting of the surface are at this point unable to develop any cohesive strengths whatsoever. Only as recrystallization begins are initial strengths developed, albeit then high ones.

When polyols which are liquid at room temperature are used, the Dahlquist criterion is not met in the room temperature range; that is, the substrates which are to be bonded with adhesives of this kind must be fixed mechanically until a chemical reaction with atmospheric moisture ensues.

FIG. 1 shows exemplarily the course of the storage modulus as a function of the temperature for the first (comparative examples 1 and 2) and the second (comparative example 3) case.

Within the art, attempts are made, by combining crystalline polyols, polyols which are liquid at room temperature (glass transition temperatures Tg<20° C.) and amorphous polyols with higher glass transition temperatures (Tg>20° C.), to optimize the Dahlquist range, i.e. to obtain a polymer melt having PSA properties which allows a certain repositioning of the substrates to be bonded, but which owing to the PSA properties already has sufficient strength to hold this position. For instance, "Shaping Reactive Hot Melts Using LMW Copolyesters", Adhesives Age, November 1987, p. 32 ff. describes reactive polyurethane hotmelts comprising crystalline polyesters, polyesters which are liquid at room temperature, and amorphous polyesters.

EP-A 0 340 906 discloses reactive polyurethane hotmelts composed of a mixture of two polyurethane prepolymers, the first prepolymer being prepared from an amorphous polyol having a glass transition temperature >20° C. and the second prepolymer from a polyol which is liquid at room temperature (Tg<20° C.).

EP-A 0 511 566 describes an NCO-reactive polyurethane hotmelt adhesive composition obtainable from a mixture of a polyfunctional polyol component which is of high viscosity or liquid at room temperature and a polyfunctional polyol component which is crystalline at room temperature.

Relatively high concentrations of high-Tg polyols, however, cause embrittlement of the adhesive films and a sharp rise in viscosity, which may adversely affect the wetting of the surface.

BRIEF SUMMARY OF THE INVENTION

The object was therefore to develop formulations which have a very wide PSA window at temperatures which are as high as possible. After leaving the Dahlquist criterion, the storage modulus G' should move as rapidly as possible into the range of $>10^6$ to $10^8$ Pa, in order to develop the necessary initial forces under mechanical stress. Below the PAS window ($G'<5\times10^4$ Pa), on the other hand, the viscosity should be as low as possible, in order to allow effective wetting characteristics and trouble-free application (by nozzle application or roller application, for example).

It has now been found that, using a polyol mixture comprising crystalline polyesterpolyols, amorphous polyesterpolyols, liquid polyols and hydroxyl polyesters based on fumaric acid and 1,6-hexanediol, it is possible to formulate reactive polyurethane hotmelt systems which exhibit a very broad Dahlquist range between about 35° C. and about 75° C. without any tendency towards embrittlement.

The invention accordingly provides reactive polyurethane hotmelts based on

A at least one difunctional polyisocyanate having isocyanate contents of from 5 to 50 weight fractions (based on A)

and

B a polyol mixture comprising at least one crystallizing polyesterpolyol based on fumaric acid and 1,6-hexanediol, the ratio of A to B being chosen so that the molar ratio of NCO to OH is from 1.2 to 4.0, preferably from 1.3 to 3.0.

The reactive polyurethane hotmelts of the invention are particularly suitable for use as adhesives.

DETAILED DESCRIPTION OF THE INVENTION

Figure 1:
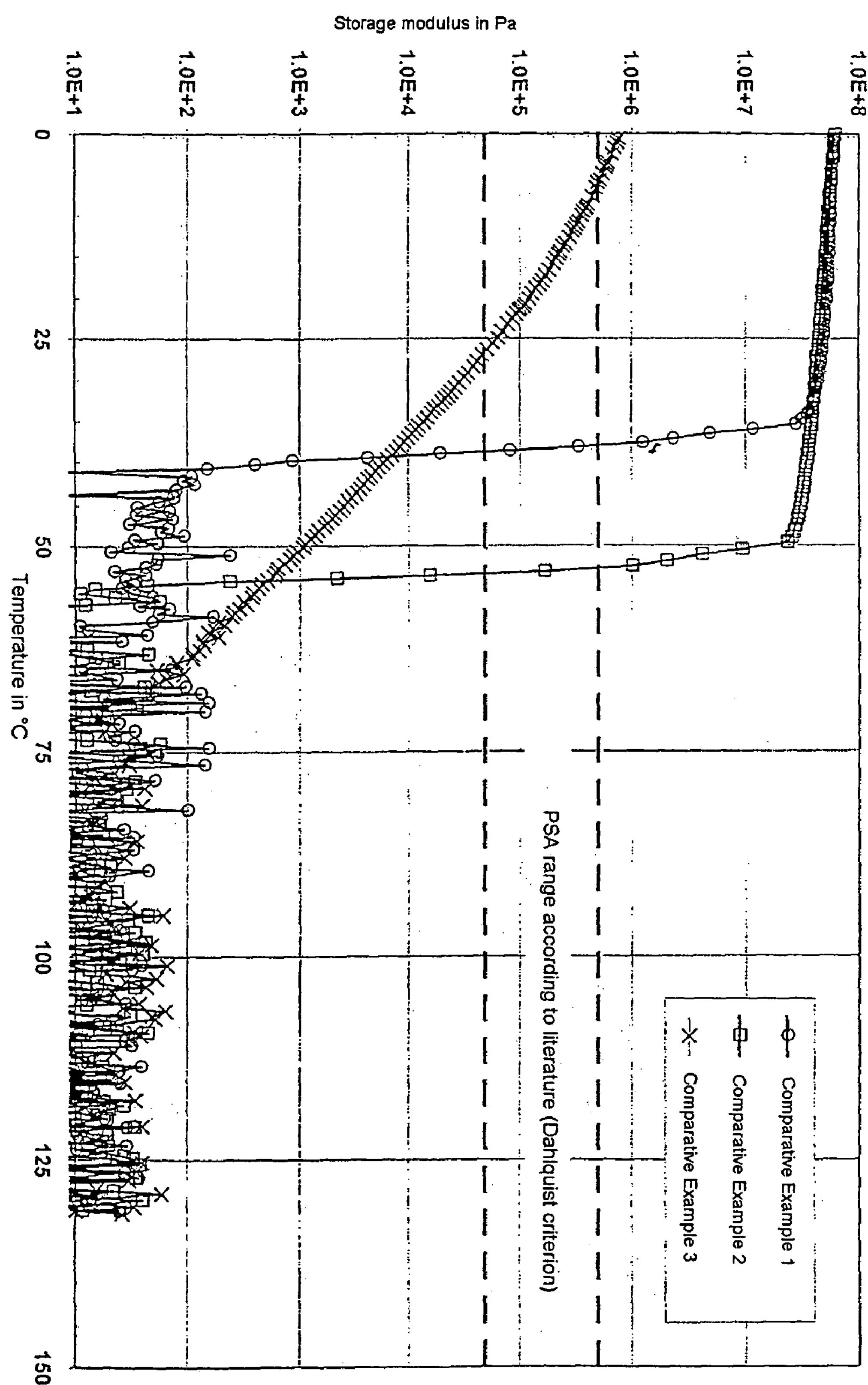
FIG. 1 is a graph of the storage modulus as a function of temperature for comparative examples.

As used herein, unless otherwise expressly specified, all of the numerical ranges, amounts, values and percentages such as those for amounts of materials, times and temperatures of reaction, ratios of amounts, values for molecular weight, and others in the following portion of the specification may be read as if prefaced by the word "about" even though the term "about" may not expressly appear with the value, amount or range.

Suitable polyisocyanates for A of the reactive polyurethane hotmelts of the present invention are, for example, those having isocyanate contents of from 5 to 50% by weight (based on A) and aliphatically, cycloaliphatically, araliphatically and/or aromatically attached isocyanate groups, such as, for example, 1,4-diisocyanatobutane, 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)-cyclohexane, 1-isocyanato-3,3,5-trimethyl-5-isocyanatomethylcyclohexane (isophorone diisocyanate, IPDI), 4,4'-diisocyanatodicyclohexylmethane, 1-isocyanato-1-methyl-4(3)-isocyanatomethylcyclohexane, bis-(isocyanatomethyl)-norbomane, 1,3- and 1,4-bis-(2-isocyanato-prop-2-yl)benzene (TMXDI), 2,4- and/or 2,6-diisocyanatotoluene (TDI), 2,2'-, 2,4'- and/or 4,4'-diisocyanato-diphenylmethane (MDI), 1,5-diisocyanatonaphthalene, 1,3- and 1,4-bis-(isocyanatomethyl)-benzene.

Preferred polyisocyanates for A are 1-6,diisocyanatohexane (HDI), 1-isocyanato-3,3,5-trimethyl-5-isocyanatomethylcyclohexane (isophorone diisocyanate, IPDI), 4,4'-diisocyanatodicyclohexylmethane, 2,4- and/or 2,6-diisocyanatotoluene (TDI), 2,2'-, 2,4'- and/or 4,4'-diisocyanatodiphenylmethane (MDI).

More preferred polyisocyanates for A are 2,2'-, 2,4'- and/or 4,4'-diisocyanatodiphenylmethane (MDI).

By a polyesterpolyol in the context of the present invention is meant a polyester having more than one OH group, preferably two terminal OH groups. Such polyesters are known to the person skilled in the art. They can be prepared by a known route, for example, from aliphatic hydroxycarboxylic acids or from aliphatic and/or aromatic dicarboxylic acids and one or more diols. It is also possible to use corresponding derivatives, such as lactones, esters of lower alcohols or anhydrides, for example. Examples of suitable starting products are succinic acid, adipic acid, suberic acid, azelaic acid, sebacic acid, dodecanedioic acid, glutaric acid, glutaric anhydride, phthalic acid, isophthalic acid, terephthalic acid, phthalic anhydride, ethylene glycol, diethylene glycol, 1,4-butanediol, 1,6-hexanediol, neopentylglycol, $\epsilon$-caprolactone.

Polyesterpolyols are either liquid (glass transition temperature Tg<20° C.) or solid at room temperature. Polyesterpolyols solid at room temperature are either amorphous (glass transition temperature Tg>20° C.) or crystallizing.

The reactive polyurethane hotmelts of the invention include in their polyol component B at least one crystallizing polyesterpolyol based on fumaric acid and 1,6-hexanediol (b1).

In their polyol component they may further include at least one further component selected from at least difunctional crystallizing polyesterpolyols (b2), at least difunctional amorphous polyesterpolyols (b3), at least difunctional polyesterpolyols liquid at room temperature (b4) and at least difunctional polyetherpolyols (b5).

Suitable crystallizing polyesterpolyols based on fumaric acid and 1,6-hexanediol (b1) are obtainable in a manner which is known to the person skilled in the art. They have OH numbers of from 10 to 60 mg KOH/g, preferably from 20 to 40 mg KOH/g and acid numbers of <2 mg KOH/g, preferably <1.5 mg KOH/g.

The crystallizing polyesterpolyols based on fumaric acid and 1,6-hexanediol (b1) are preferably preparable in the manner known to the person skilled in the art with the aid of suitable rearrangement catalysts, such as piperidine, for example, from maleic anhydride and 1,6-hexanediol.

Suitable crystallizing polyesters (b2) are, for example, those based on linear aliphatic dicarboxylic acids having from 6 to 12 carbon atoms in the molecule such as, for example, adipic acid, azelaic acid, sebacic acid and dodecanedioic acid, preferably adipic acid and dodecanedioic acid, and linear diols having 4 to 8 carbon atoms in the molecule, preferably with an even number of carbon atoms, such as, for example, 1,4-butanediol and 1,6-hexanediol. Likewise to be mentioned as being particularly suitable are the polycaprolactone derivatives based on bifunctional starter molecules such as 1,6-hexanediol, for example.

Suitable amorphous polyesterpolyols (b3) are, for example, those based on adipic acid, isophthalic acid, terephthalic acid, ethylene glycol, neopentylglycol and 3-hydroxy-2,2-dimethylpropyl 3-hydroxy-2,2-dimethylpropanoate.

Suitable polyesterpolyol liquid at room temperature (b4) are, for example, those based on adipic acid, ethylene glycol, 1,6-hexanediol and neopentylglycol.

Polyethers suitable as polyetherpolyol (b5) are those which are customary in polyurethane chemistry, such as, for example, the addition compounds or mixed addition compounds of tetrahydrofuran, of styrene oxide, of ethylene oxide, of propylene oxide, of the butylene oxides or of epichlorohydrin, preferably of ethylene oxide and/or of propylene oxide, that are prepared using dihydric to hexahydric starter molecules such as, for example, water, ethylene glycol, 1,2- or 1,3-propylene glycol, neopentylglycol, glycerol, trimethylolpropane, pentaerythritol, sorbitol or amines having 1- to 4-NH bonds. Mention may be made preferably of the difunctional propylene oxide adducts and/or ethylene oxide adducts and also polytetrahydrofuran. Such polyetherpolyols and their preparation are known to the person skilled in the art.

One possible embodiment of the invention is a reactive polyurethane hotmelt based on A at least one difunctional polyisocyanate having isocyanate contents of from 5 to 50 weight fractions and B a polyol mixture composed of

- b1) from 15 to 55 weight fractions of crystallizing polyesterpolyols based on fumaric acid and 1,6-hexanediol, having hydroxyl numbers of from 20 to 40 mg KOH/g and acid numbers of <2 mg KOH/g,
- b2) from 0 to 85 weight fractions of at least difunctional crystallizing polyesterpolyols,
- b3) from 0 to 85 weight fractions of at least difunctional polyesterpolyols liquid at room temperature,
- b4) from 0 to 60 weight fractions of at least difunctional amorphous polyesterpolyols,
- b5) from 0 to 40 weight fractions of at least difunctional polyetherpolyols, the sum of the weight fractions of components b1) to b5) making 100 parts by weight.

The ratio of A to B in this case is chosen so that the molar ratio of NCO to OH is from 1.3 to 3.0.

One preferred embodiment of the invention is a reactive polyurethane hotmelt based on A at least one difunctional polyisocyanate having isocyanate contents of from 5 to 50 weight fractions and B a polyol mixture composed of

- b1) from 15 to 30 weight fractions of crystallizing polyesterpolyols based on fumaric acid and 1,6-hexanediol, having hydroxyl numbers of from 20 to 40 mg KOH/g and acid numbers of <2 mg KOH/g,
- b2) from 20 to 85 weight fractions of at least difunctional crystallizing polyesterpolyols,
- b3) from 0 to 70 weight fractions of at least difunctional polyesterpolyols liquid at room temperature,
- b4) from 0 to 40 weight fractions of at least difunctional amorphous polyesterpolyols,
- b5) from 0 to 30 weight fractions of at least difunctional polyetherpolyols, the sum of the weight fractions of components b1) to b5) making 100 weight fractions.

For certain applications of the PU hotmelt of the invention, it can be preferable for the polyol mixture (B) to be composed of from 15 to 30 weight fractions of b1), from 20 to 75 weight fractions of b2) and from 10 to 65 weight fractions of b3), the sum of the weight fractions making 100.

A likewise preferred embodiment of the invention is a reactive polyurethane hotmelt whose polyol mixture B is composed of from 15 to 30 weight fractions of b1), from 30 to 75 weight fractions of b2) and from 10 to 40 weight fractions of b4), the sum of the weight fractions making 100.

It may further be preferable for the polyol mixture B to be composed of from 15 to 30 weight fractions of b1), from 40 to 80 weight fractions of b2) and from 5 to 30 weight fractions of b5), the sum of the weight fractions making 100.

It may also be preferable for the polyol mixture B to be composed of from 15 to 30 weight fractions of b1), from 20 to 75 weight fractions of b2) and from 10 to 60 weight fractions of b3) and from 10 to 40 weight fractions of b4), the sum of the weight fractions making 100.

Finally, it is also possible and likewise preferred for the polyol mixture B to be composed of from 15 to 30 weight fractions of b1), from 20 to 75 weight fractions of b2) and from 10 to 60 weight fractions of b3), from 10 to 40 weight fractions of b4) and from 5 to 30 weight fractions of b5), the sum of the weight fractions making 100.

In this case the ratio of A to B is chosen so that the molar ratio of NCO to OH is from 1.3 to 3.0.

The hotmelt systems may be modified with catalysts which activate the reaction with moisture, organic or inorganic fillers, dyes, resins and/or extender oils in customary fashion.

The reactive hotmelt systems containing isocyanate groups are prepared, for example, by mixing the liquid polyols with an excess of the polyisocyanates and discharging the homogeneous mixture or stirring it until a constant NCO level is obtained, which is generally achieved after two hours, and then discharging it. The reaction temperature chosen is from 60 to 150° C., preferably from 80 to 130° C. Naturally, the preparation of the reactive hotmelts may also take place continuously in a stirred tank cascade or in suitable mixing equipment, such as high-speed mixers operating in accordance with the rotor-stator principle, for example.

It is of course possible to modify the polyester- and/or polyetherpolyols or a part thereof with a deficit amount of diisocyanates, preferably 1,6-diisocyanatohexane (HDI), 2,4- and/or 2,6-diisocyanatotoluene (TDI) and/or 2,4'- and/or 4,4'-diisocyanatodiphenylmethane (MDI), and, after the end of the reaction, to react the urethane-group-containing polyols with an excess of diisocyanates to give a hotmelt containing isocyanate groups.

Likewise it is possible to conduct the reaction of the polyols with the diisocyanates in the presence of up to 5% by weight of, for example, trimers of aliphatic diisocyanates, such as hexamethylene diisocyanate, for example, or to add such trimers after the end of prepolymerization.

The hotmelt systems of the invention can be employed diversely as adhesives: for example, as an assembly adhesive for the preliminary fixing of components, as a bookbinding adhesive or as adhesives for the production of crossbottom valve sacks, composite films or laminates, or as edgebonding glues.

The invention accordingly further provides for the use of the reactive polyurethane hotmelts of the invention as adhesives. In use, a reactive polyurethane hotmelt of the invention is applied to a first surface of a first substrate. A second substrate is then placed in contact with the first surface of the first substrate so that the first substrate and the second substrate adhere.

The invention is further illustrated but is not intended to be limited by the following examples in which all parts and percentages are by weight unless otherwise specified.

EXAMPLES

Example of the Preparation of a Polyester Based on Fumaric Acid and 1,6-hexanediol (Polyester B)

7899 g of 1,6-hexanediol and 32.5 g of toluhydroquinone solution (40% in Dowanol® PM, Dow Chemicals) are weighed out into a 15 l stirred tank equipped with a stirrer, a distillation bridge with column, and a nitrogen inlet tube and are melted at a temperature of 120° C. A nitrogen stream of 15 to 16 l/hour is passed through the tank. As soon as the contents of the tank become stirrable, the mixture is stirred at a speed of 20 rpm. When the 1,6-hexanediol has melted completely, 7394 g of fumaric acid are added in portions at 120° C. The nitrogen flow is raised to twice the tank volume (30 to 32 l/hour) and heating is carried out to 180° C. subject to an overhead temperature limit of max. 105° C. In the course of this heating the majority of the water of reaction is eliminated, the temperature of the liquid phase reaching 180° C. Condensation takes place at 180° C. until an acid number of 10 to 12 mg KOH/g is reached. Then 0.39 g of tin(II) chloride 2-hydrate is added and a column with Claisen bridge and cooled receiver is mounted on the reaction tank. The nitrogen flow is reduced to 2 to 3 l/hour and slowly a vacuum of approximately 15 mbar is applied. The reaction mixture is held under these conditions until an acid number of <1.5 mg KOH/g is reached. Thereafter the mixture is cooled to 120° C. and discharged. The polyester thus prepared has a hydroxyl number of 31 mg KOH/g (determined in accordance with DIN 53 240 part 2) and an acid number of 0.8 mg KOH/g (determined in accordance with DIN 2114).

Example of the Preparation of a Fumaric Acid/1,6-hexanediol Polyester from Maleic Anhydride and 1,6-hexanediol (Polyester K)

3038 g of 1,6-hexanediol, 5 g of piperidine and 12.5 g of toluhydroquinone solution (40% in Dowanol® PM, Dow Chemicals) are weighed out into a 5 l stirred tank equipped with a stirrer, a distillation bridge with column, and a nitrogen inlet tube and are melted at a temperature of 120° C. A nitrogen stream of 5 to 6 l/hour is passed through the tank. As soon as the contents of the tank become stirrable, the mixture is stirred at a speed of 20 rpm. When the 1,6-hexandiol has melted completely, 2403 g of maleic anhydride are added in portions at 120° C. The nitrogen flow is raised to twice the tank volume (10 to 12 l/hour) and heating is carried out to 180° C. subject to an overhead temperature limit of max. 105° C. In the course of this heating the majority of the water of reaction is eliminated, the temperature of the liquid phase reaching 180° C. Condensation takes place at 180° C. until an acid number of 10 to 12 mg KOH/g is reached. Then 0.15 g of tin(II) chloride 2-hydrate is added and a column with Claisen bridge and cooled receiver is mounted on the reaction tank. The nitrogen flow is reduced to 2 to 3 l/hour and slowly a vacuum of approximately 15 mbar is applied. The reaction mixture is held under these conditions until an acid number of <1.5 mg KOH/g is reached. Thereafter the mixture is cooled to 120° C. and discharged. The polyester thus prepared has a hydroxyl number of 32 mg KOH/g (determined in accordance with DIN 53 240 part 2) and an acid number of 1.5 mg KOH/g (determined in accordance with DIN 2114).

In the inventive and comparative examples the following polyols were used:

Polyester A:

Polyesterpolyol based on filmaric acid and 1,6-hexanediol, having a hydroxyl number of 20 mg KOH/g and an acid number of 1.3 mg KOH/g. The preparation is analogous to that of Polyester B.

Polyester B:

Polyesterpolyol based on fumaric acid and 1,6-hexanediol, having a hydroxyl number of 31 mg KOH/g and an acid number of 0.8 mg KOH/g. Preparation is as indicated above.

Polyester C:

Polyesterpolyol based on fumaric acid and 1,6-hexanediol, having a hydroxyl number of 40 mg KOH/g and an acid number of 1.0 mg KOH/g. The preparation is analogous to that of Polyester B.

Polyester D:

Polyesterpolyol based on adipic acid and 1,6-hexanediol, having a hydroxyl number of about 30 mg KOH/g and an acid number of about 0.5 mg KOH/g. Preparation is in a manner known to the person skilled in the art and is described, for example, in Ullmanns Enzyklopädie der technischen Chemie, “Polyester”, 4th edition, Verlag Chemie, Weinheim, 1980.

Polyester E:

Polyesterpolyol based on dodecanedioic acid and 1,6-hexanediol, having a hydroxyl number of about 30 mg KOH/g and an acid number of about 0.8 mg KOH/g. Preparation is in a manner known to the person skilled in the art and is described, for example, in Ullmanns Enzyklopädie der technischen Chemie, “Polyester”, 4th edition, Verlag Chemie, Weinheim, 1980.

Polyester F:

Polyesterpolyol with the following composition

| | Weight fraction in the polyester in % |
|---|---|
| ethylene glycol | about 15.4 |
| 1,6-hexanediol | about 20.4 |
| neopentylglycol | about 7.8 |
| adipic acid | about 31.6 |
| terephthalic acid | about 24.8 |

and a hydroxyl number of about 31.8 mg KOH/g and an acid number of about 1.2 mg KOH/g. Preparation is in a manner known to the person skilled in the art and is described, for example, in Ullmanns Enzyklopädie der technischen Chemie, “Polyester”, 4th edition, Verlag Chemie, Weinheim, 1980.

Polyester G:

Polyesterpolyol with the following composition

| | Weight fraction in the polyester in % |
|---|---|
| ethylene glycol | about 17.0 |
| 1,6-hexanediol | about 19.5 |
| neopentylglycol | about 8.1 |
| adipic acid | about 55.4 |

and a hydroxyl number of about 22 mg KOH/g and an acid number of about 1.5 mg KOH/g. Preparation is in a manner known to the person skilled in the art and is described, for example, in Ullmanns Enzyklopädie der technischen Chemie, "Polyester", 4th edition, Verlag Chemie, Weinheim, 1980.

Polyester H:

Polyesterpolyol with the following composition

| | Weight fraction in the polyester in % |
|---|---|
| ethylene glycol | about 15.3 |
| neopentylglycol | about 10.3 |
| 3-hydroxy-2,2-dimethylpropyl 3-hydroxy-2,2-dimethylpropanoate | about 21.0 |
| adipic acid | about 6.0 |
| isophthalic acid | about 20.7 |
| terephthalic acid | about 26.7 |

and a hydroxyl number of about 34.7 mg KOH/g and an acid number of about 1.2 mg KOH/g. Preparation is in a manner known to the person skilled in the art and is described, for example, in Ullmanns Enzyklopädie der technischen Chemie, "Polyester", 4th edition, Verlag Chemie, Weinheim, 1980.

Polyether I:

Polypropylene oxide having a hydroxyl number of about 112 mg KOH/g.

The polyether is prepared in a commonly known way with KOH catalysis, for example according to L. E. St. Pierre, Polyethers Part I, Polyalkylene Oxide and other Polyethers, Editor: Norman G. Gaylord; High Polymers Vol. XIII; Interscience Publishers; Newark 1963; p. 130 ff.

Preparation of the Polyurethane Hotmelts (Inventive and Comparative Examples)

A 2 l beaker with plane-ground joints is charged with 1 mol of the polyol mixture indicated in table 1, which is melted at 130° C. and then dewatered at 130° C. under a subatmospheric pressure of 15 mbar (+/−10 mbar) for 1 h. Subsequently 2 mol of 4,4'-diisocyanatodiphenylmethane (Desmodur® 44 M, Bayer AG, Leverkusen) are added. After a time of 20 minutes for stirred incorporation, the products are dispensed into aluminium cartridges, which are given an airtight seal. The cartridges are then conditioned in a forced-air drying cabinet at 100° C. for 4 h.

Rheological Characterization of the Reactive Polyurethane Hotmelts

Prior to the investigation, the products discharged into aluminium cartridges are melted in a forced-air heating cabinet at about 125° C. for about 30 minutes. For the measurement of the viscoelastic variables on polyurethane hotmelts, measurement is carried out at the fixed frequency of 1 Hz. The temperature is lowered from 130° C. to 0° C. at a cooling rate of 2° C./min. Since the samples contract on cooling, measurement must be carried out with a rheometer which possesses an "auto tension function".

The viscoelastic properties of the reactive polyurethane hotmelts are characterized using the VOR-Melt rheometer from BOHLIN Instruments by means of an oscillation program and the 25HT plate/plate system. The instrument serves to characterize the viscoelastic properties of high-viscosity substances such as polymer melts, rubbers, etc. as a function of temperature and frequency.

The storage modulus as a function of temperature is shown in FIG. 1 for comparative examples 1, 2 and 3. In these figures the range for the Dahlquist criterion is characterized by its upper and lower limit.

Figure 2:
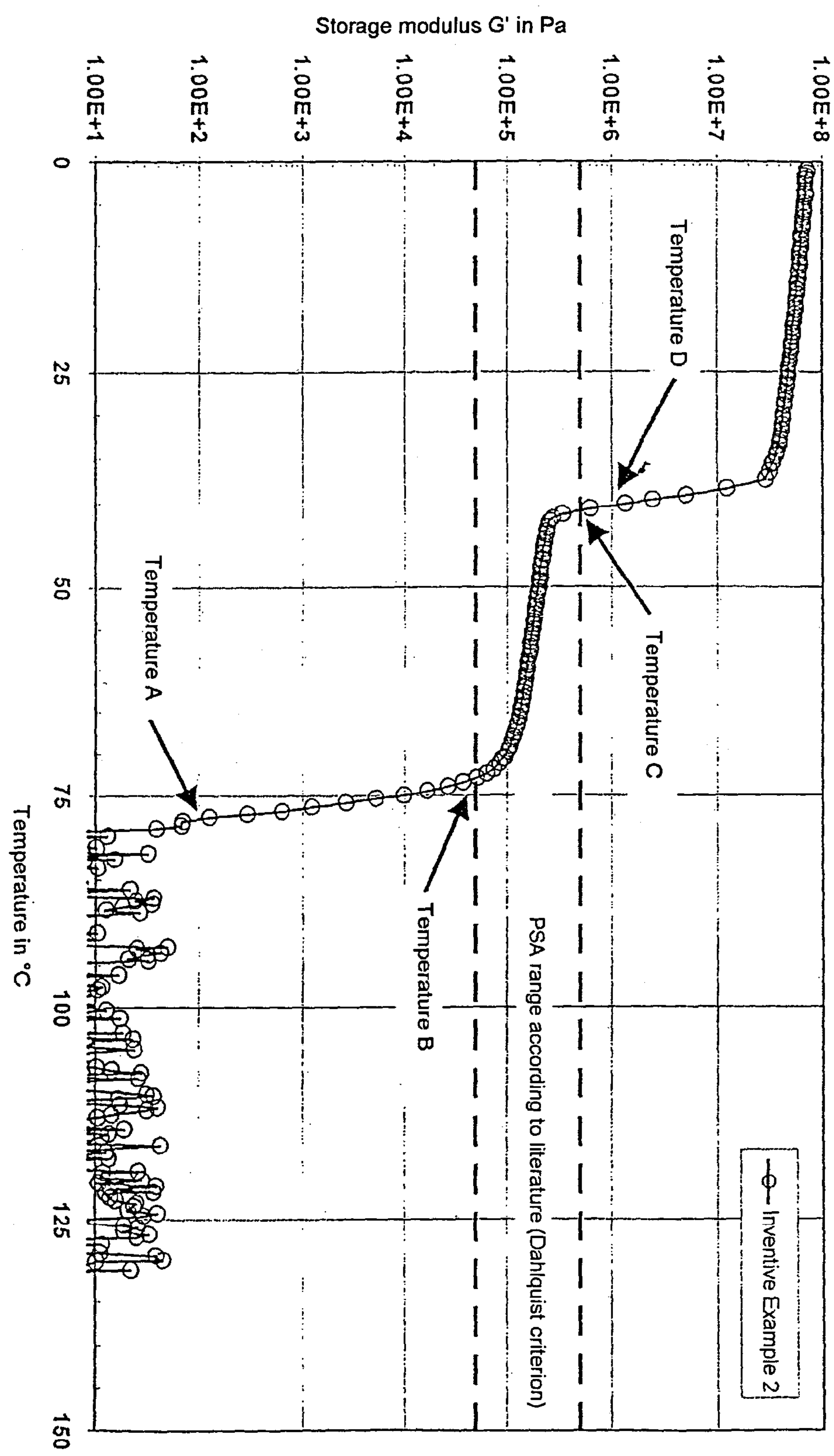
FIG. 2 is a graph of storage modulus as a function of temperature for an inventive example.

For the inventive and comparative examples the course of the storage modulus as a function of temperature is described by the four characteristic temperatures A, B, C and D. These have been drawn in for illustration in FIG. 2. Above temperature A the storage modulus G' has values of less than $10^2$ Pa. In this region the melt is sufficiently mobile to ensure effective wetting of the substrates to be bonded. At temperature B the storage modulus reaches a figure of $5\times10^4$ Pa, i.e. from this temperature the storage modulus runs within the PSA band (Dahlquist criterion). At temperature C the storage modulus reaches a level of $5\times10^5$ Pa, i.e. below this temperature the storage modulus runs above the PSA band. Between temperatures B and C the polymer melt exhibits PSA properties which allow a certain repositioning of the substrates to be bonded, but owing to the PSA properties it already has sufficient strength to hold this position. Below temperature D the storage modulus reaches values $>10^6$ Pa, already corresponding to forces so high that it is no longer possible to reposition the substrates to be bonded any further at all. The characteristic temperatures A, B, C and D are compiled in Table 1 for the inventive and comparative examples.

Measurement of the Hot Tack:

Prior to the investigation, the products discharged into aluminium cartridges are melted in a forced-air heating cabinet at about 125° C. for about 30 minutes. Then, using a doctor blade, a film of the corresponding product 0.2 mm thick is produced on an aluminium plate and the hot tack is determined by means of a fully automatic measuring instrument developed at Bayer AG. (A description is given in H.-. W. Lucas, et. al., "Hot-Tack Measurements: An Efficient Development Tool for Water-Based Polyurethanes" in Adhesives Age, February 1997, page 18 ff).

For this purpose, the film applied by knife coating is subjected to a temperature gradient. A robot arm is then used to press a die made of VA-grade steel onto the adhesive sample with an applied pressure of 10 bar for 15 s. Subsequently, die and sample are separated from one another with a removal speed of 2 mm/s. In the course of this operation the force (tack force) required to separate die and sample is measured.

Figure 3:
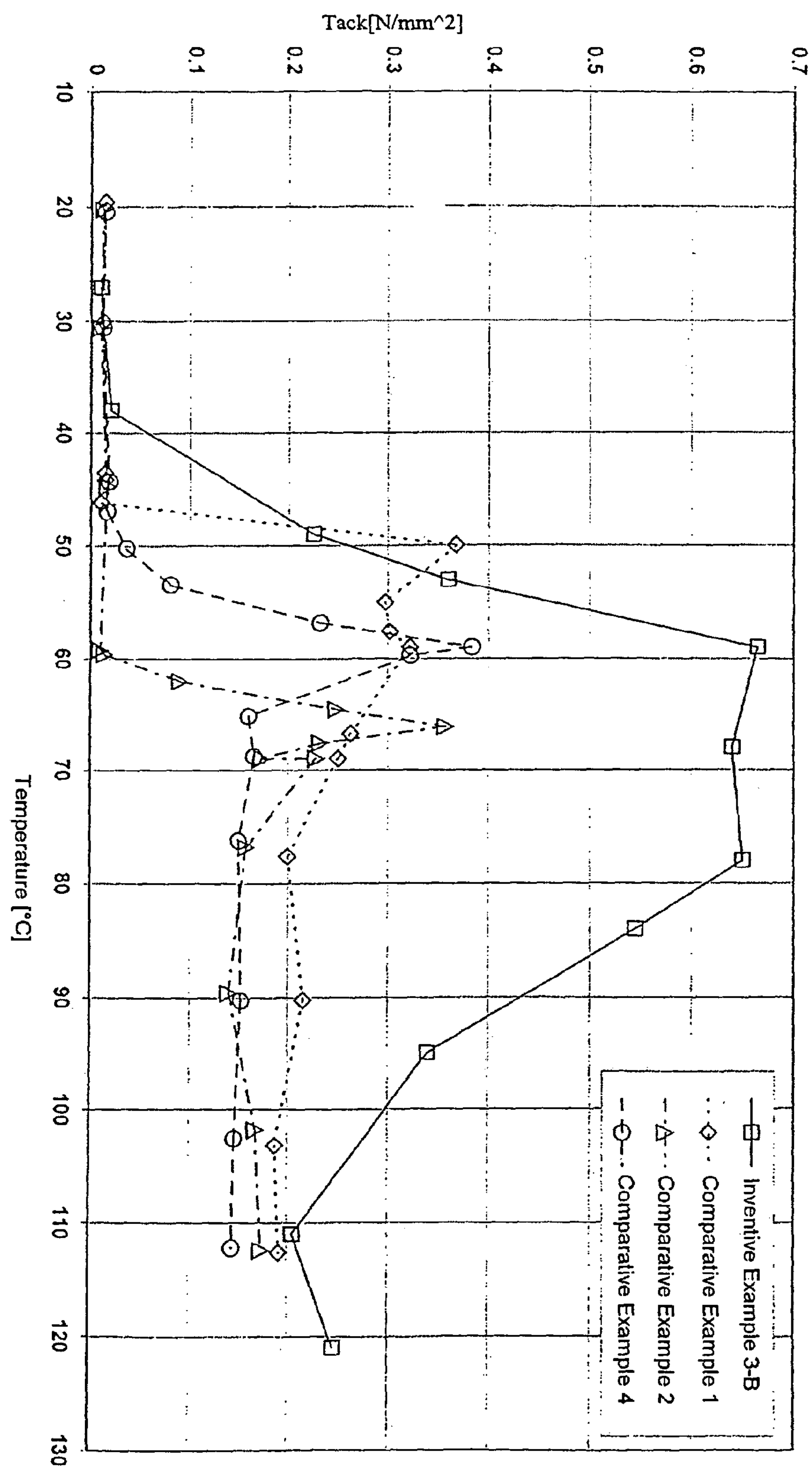
FIG. 3 is a graph of tack as a function of temperature for comparative and inventive examples.

Discussion of the Results:

In the case of the crystalline polyesterpolyols (comparative examples 1 and 2 in FIG. 1) the storage modulus G' runs in the range <1000 Pa up until shortly above the recrystallization temperature of about 40° C. or about 55° C., respectively, which means that the melt still has no cohesive strength at all and work pieces to be bonded must be held mechanically. The Dahlquist criterion is traversed within a temperature range of a few degrees, in order to develop storage moduli of $>10^6$ Pa immediately, which already correspond to forces so high that they no longer allow any further repositioning of the substrates to be bonded at all. These observations are confirmed by measurement of the hot tack (see comparative examples 1, 2 and 4 in FIG. 3). Below the melting temperature of the polyesterpolyols, i.e. in the range in which the storage modulus G' has values $>10^6$ Pa, the adhesive film is solid. Accordingly, it is not possible to produce intimate contact between die and polymer sample, and no hot tack is measured. Only at the melting temperature of the crystalline polyesterpolyol, where the storage modulus G' runs between $5\times10^4$ Pa and $5\times10^5$ Pa, i.e. in the range of the PSA band, is it possible to bring die and polymer sample into such intimate contact that the short-range physical adhesion mechanisms become active and the sample exhibits a measurable tack. Above the melting temperature (storage modulus G'<1000 Pa) the polymer film is in the form of a melt and no longer exhibits adequate cohesive strength, leading to the hot tack falling again. Reactive polyurethane hotmelts of this type have PSA properties only within a very narrow temperature range of a few ° C. Above this temperature range it is necessary to fix the bonds mechanically and below this temperature range the forces are already so great that they no longer allow any further repositioning of the substrates to be bonded. This means that after the parts to be bonded have been joined it is no longer possible to correct the bond.

In the case of the polyol liquid at room temperature (comparative example 3 in FIG. 1) the Dahlquist criterion is not satisfied in the room temperature range; in other words, substrates to be bonded with adhesives of this kind must be fixed mechanically until a chemical reaction with atmospheric moisture ensues.

In the case of the reactive polyurethane hotmelts of the invention (see for instance example 2 in FIG. 2), on the other hand, the storage modulus G' runs in a broad temperature window between about 35° C. and about 75° C. within the PSA band (Dahlquist criterion); accordingly, the polymer melt has PSA properties which, although allowing a certain repositioning of the substrates to be bonded, already has sufficient strength, owing to the PSA properties, to hold this position. Above about 75° C. the storage modulus G' runs <1000 Pa; in other words, here the reactive polyurethane hotmelt is in the form of a low-viscosity melt and is therefore able to ensure effective wetting of the parts to be bonded. Below about 35° C., the storage modulus immediately develops values of $>10^6$ Pa. This corresponds already to forces so high that any further repositioning of the substrates to be bonded is no longer possible. Here again, the measurement of the hot tack confirms the results of the viscoelastic measurements (inventive example 3-B in FIG. 3). The reactive polyurethane hotmelts exhibit a hot tack within a very wide temperature range, i.e. they have PSA properties within this temperature range.

This constitutes a decisive advantage in connection with application, since these systems, owing to their PSA properties, already have sufficient strength that the substrates to be bonded hold their position without mechanical fixing, while on the other hand a certain repositioning of the substrates to be bonded, and hence a correction of the bond, is still possible.

TABLE 1

Composition of the polyol mixtures for the various inventive and comparative examples and characteristic temperatures for the course of the storage modulus G' as a function of temperature (for explanation see text)

| | Composition of polyol mixture | | | | | | Temperature in ° C. | | | |
|---|---|---|---|---|---|---|---|---|---|---|
| Example No. | Polyol 1 | Weight fraction in % | Polyol 2 | Weight fraction in % | Polyol 3 | Weight fraction in % | A | B | C | D |
| Comparative example 1 | Polyester D | 100 | — | — | — | — | about 41 | about 38.5 | about 38 | about 37.5 |
| Comparative example 2 | Polyester E | 100 | — | — | — | — | about 54.5 | about 53.5 | about 53 | about 52.5 |
| Comparative example 3 | Polyester F | 100 | — | — | — | — | about 63 | about 25.5 | about 5 | <0 |
| Comparative example 4 | Polyester D | 70 | Polyester E | 30 | — | — | about 52.5 | about 49.5 | about 46.5 | about 46 |
| Inventive example 1 | Polyester D | 80 | Polyester A | 20 | — | — | about 75 | about 65 | about 40.5 | about 40 |
| Inventive example 2 | Polyester D | 80 | Polyester B | 20 | — | — | about 77.5 | about 73 | about 41 | about 40.5 |
| Inventive example 3-A | Polyester D | 85 | Polyester C | 15 | — | — | about 65.5 | about 55.5 | about 40.5 | about 40 |
| Inventive example 3-B | Polyester D | 80 | Polyester C | 20 | — | — | about 68 | about 63 | about 40.5 | about 40 |
| Inventive example 4 | Polyester D | 20 | Polyester G | 60 | Polyester B | 20 | about 77.5 | about 68.5 | about 33.5 | about 33 |
| Inventive example 5 | Polyester D | 60 | Polyester H | 20 | Polyester B | 20 | about 75.5 | about 70.5 | about 37 | about 36.5 |
| Inventive example 6 | Polyester E | 45 | Polyester B | 55 | — | — | >130 | about 77 | about 60.5 | about 60 |
| Inventive example 7 | Polyester D | 60 | Polyether I | 20 | Polyester B | 20 | about 75.5 | about 66 | about 36 | about 35.5 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Reactive polyurethane hotmelts comprising the reaction product of

A a polyisocyanate component comprising at least one difunctional polyisocyanate having an isocyanate content of from 5 to 50% by weight (based on A) and B a polyol mixture comprising at least one crystallizing polyesterpolyol (b1) which is the reaction product of fumaric acid and 1,6-hexanediol, wherein the ratio of polyisocyanate component A to polyol component B is chosen so that the molar ratio of NOC to OH is from 1.2 to 4.0, and wherein the hotmelt has a storage modulus of $5\times10^4$ to $5\times10^5$ Pa in a temperature range of from 35° C. to 75° C.

2. Reactive polyurethane hotmelts according to claim 1 wherein the fraction of crystallizing polyesterpolyol (b1) in polyol component B amounts to from 15 to 55 weight fractions.

3. Reactive polyurethane hotmelts according to claim 1, wherein the fraction of crystallizing polyesterpolyol (b1) in polyol component B amounts to from 15 to 30 weight fractions.

4. Reactive polyurethane hotmelts according to claim 1, further comprising a fraction of at least difunctional crystallizing polyesterpolyols (b2) in polyol component B in amounts to up to 85 weight fractions.

5. Reactive polyurethane hotmelts according to claim 1, further comprising a fraction of polyesterpolyols liquid at room temperature (b3) in polyol component B in amounts to up to 85 weight fractions.

6. Reactive polyurethane hotmelts according to claim 1, further comprising a fraction of amorphous polyesterpolyols (b4) in polyol component B in amounts to up to 60 weight fractions.

7. Reactive polyurethane hotmelts according to claim 1, further comprising a fraction of polyetherpolyols (b5) in polyol component B in amounts to up to 40 weight fractions.

8. Reactive polyurethane hotmelts according to claim 1, wherein the ratio of polyisocyanate component A to polyol component B is chosen so that the molar ratio of NCO to OH is from 1.3 to 3.0.

9. Process for preparing the reactive polyurethane hotmelts according to claim 1, comprising a) mixing the liquid polyols B with an excess of the polyisocyanates A, b) producing a homogeneous mixture of liquid polyols B and polyisocyanates A, and c) discharging the homogeneous mixture.

10. Method for adhering a first substrate and a second substrate, comprising a) applying reactive polyurethane hotmelts according to claim 1 to a first surface of a first substrate, b) placing a second substrate in contact with the first surface of the first substrate.

11. The process of claim 9, further comprising the additional step of stirring the mixture until a constant NCO level is obtained.

12. Reactive polyurethane hotmelts according to claim 1 wherein crystallizing polyesterpolyol (b1) has an OH number of 10 to 60 mg KOH/g.

13. Reactive polyurethane hotmelts according to claim 2 wherein crystallizing polyesterpolyol (b1) has an OH number of 10 to 60 mg KOH/g.

14. Reactive polyurethane hotmelts according to claim 3 wherein crystallizing polyesterpolyol (b1) has an OH number of 10 to 60 mg KOH/g.

15. Reactive polyurethane hotmelts according to claim 4 wherein crystallizing polyesterpolyol (b1) has an OH number of 10 to 60 mg KOH/g.

16. Reactive polyurethane hotmelts according to claim 1 wherein crystallizing polyesterpolyol (b1) has an OH number of 20 to 40 mg KOH/g.

17. Reactive polyurethane hotmelts according to claim 2 wherein crystallizing polyesterpolyol (b1) has an OH number of 20 to 40 mg KOH/g.

18. Reactive polyurethane hotmelts according to claim 3 wherein crystallizing polyesterpolyol (b1) has an OH number of 20 to 40 mg KOH/g.

19. Reactive polyurethane hotmelts according to claim 4 wherein crystallizing polyesterpolyol (b1) has an OH number of 20 to 40 mg KOH/g.

* * * * *